(12) United States Patent
Miyagawa (10) Patent No.: US 9,292,751 B2
(45) Date of Patent: Mar. 22, 2016

(54) OBJECT IDENTIFIER

(71) Applicant: HONDA MOTOR CO., LTD., Minato-ku, Tokyo (JP)

(72) Inventor: Keisuke Miyagawa, Tochigi-Ken (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/428,035

(22) PCT Filed: Jun. 20, 2013

(86) PCT No.: PCT/JP2013/066972
§ 371 (c)(1),
(2) Date: Mar. 13, 2015

(87) PCT Pub. No.: WO2014/041864
PCT Pub. Date: Mar. 20, 2014

(65) Prior Publication Data
US 2015/0242694 A1    Aug. 27, 2015

(30) Foreign Application Priority Data

Sep. 14, 2012  (JP) .................. 2012-202397

(51) Int. Cl.
*G06K 9/00*   (2006.01)
*B60R 1/00*   (2006.01)
*G06K 9/46*   (2006.01)
*G06F 7/00*   (2006.01)

(52) U.S. Cl.
CPC .............. *G06K 9/00805* (2013.01); *B60R 1/00* (2013.01); *G06K 9/4614* (2013.01); *B60R 2300/307* (2013.01); *B60R 2300/8033* (2013.01)

(58) Field of Classification Search
USPC ......... 382/100, 103–107, 162, 166, 168, 173, 382/181, 194, 199, 209, 219, 222, 232, 243, 382/254, 274, 276, 286–291, 305, 312, 382/317; 340/435; 250/208.1; 701/36; 348/222.1, 114
See application file for complete search history.

(56) References Cited

U.S. PATENT DOCUMENTS

| | | | | |
|---|---|---|---|---|
| 4,768,088 A * | 8/1988 | Ando | ................... | G05B 19/106 348/114 |
| 7,164,117 B2 * | 1/2007 | Breed | ............... | B60R 21/01516 250/208.1 |
| 7,307,655 B1 * | 12/2007 | Okamoto | ........... | G06K 9/00791 348/222.1 |
| 2004/0143380 A1 * | 7/2004 | Stam | ...................... | B60Q 1/085 701/36 |
| 2007/0222566 A1 * | 9/2007 | Tsuji | .................. | G06K 9/00791 340/435 |

FOREIGN PATENT DOCUMENTS

JP    4582079 B2    11/2010

* cited by examiner

*Primary Examiner* — Seyed Azarian
(74) *Attorney, Agent, or Firm* — Carrier Blackman & Associates, P.C.; William D. Blackman; Joseph P. Carrier (57) ABSTRACT

An object identifier is provided with a data-forming unit and a data-retrieving unit. The data-forming unit forms an integral image having an image region of the same size as an original image and an image to be integrated. The data-retrieving unit obtains compressed data derived by extracting, from a plurality of pixels constituting the integral image, at least every other pixel in at least one direction.

7 Claims, 11 Drawing Sheets

FIG. 9A (COMPARATIVE EXAMPLE)

FIG. 9B (COMPARATIVE EXAMPLE)

FIG. 9C

OBJECT IDENTIFIER

TECHNICAL FIELD

The present invention relates to an object identifying apparatus for generating integral images from an input image, and identifying whether a particular object exists in the image using the integral images.

BACKGROUND ART

Recently, various image processing technologies have been proposed for reducing the amount of processing operations using integral images, when an image processing sequence is carried out to identify whether or not a particular object exists within an input image. Such integral images are equivalent to interim data for calculating a total of the pixel values residing within a region of interest that is extracted from an image area.

Japanese Patent No. 4582079 proposes an apparatus for and a method of dividing a single image area into a plurality of integration areas, and then generating respective integral data corresponding to the integration areas. The publication states that the method is capable of cutting back the maximum value of the pixel values contained in the integral data, thereby reducing the amount of data per pixel.

SUMMARY OF INVENTION

However, the method, etc., disclosed in Japanese Patent No. 4582079 is only capable of reducing the amount of data by a number of bits on the order of a logarithm of the number of the integration areas. More specifically, according to the description (see paragraph [0066]) of this patent document, a reduction of only about 7% is achieved by removing 1 bit from 15 bits.

The present invention has been made with the aim of solving the aforementioned problems. An object of the present invention is to provide an object identifying apparatus, which is capable of maintaining the accuracy with which an object can be identified while greatly reducing the amount of data that makes up the integral images.

According to the present invention, there is provided an object identifying apparatus including a data generator for successively integrating pixel values of integration object images representing feature quantities at respective pixels that make up an original image, from a starting point at either one of angular positions of the integration object images, thereby generating integral images, each including an image area having a size in common with the original image and the integration object images, a data acquirer for acquiring compressed data by extracting at least every other pixel along at least one direction from a plurality of pixels that make up the integral images generated by the data generator, an identification object region determiner for determining an identification object region from within an original image area represented by the original image, and an object identifier for calculating a total of the pixel values of the integration object images within the identification object region that was determined by the identification object region determiner, as an image feature quantity using the compressed data acquired by the data acquirer, and on the basis of the image feature quantity, identifying whether or not an object exists within the identification object region in the original image.

Since the object identifying apparatus includes the data generator, which generates integral images, each including an image area having a size in common with the original image and the integration object images, and the data acquirer, which acquires compressed data by extracting at least every other pixel along at least one direction from a plurality of pixels that make up the integral images, the object identifying apparatus is capable of obtaining the compressed data that makes up the integral images, in which original information of the integration object images at the positions of the extracted pixels is retained without change. By appropriately using the retained image information, the accuracy with which an object is identified can be maintained, while the amount of data that makes up the integral images is greatly reduced.

The identification object region determiner preferably determines the identification object region, which includes at least four pixels at vertices thereof, selected respectively from pixel groups extracted as the compressed data. Therefore, although compressed data are used, a total of the pixel values of the integration object images can accurately be calculated.

The data acquirer preferably acquires the compressed data by reducing the amount of data of each of the pixels of the integral images by at least one bit. Thus, the amount of data that makes up the integral images can further be reduced.

If the identification object region determiner determines the identification object region, and the object identifier identifies the object while a position of the identification object region is changed sequentially along a scanning direction at a scanning interval, thereby identifying whether or not the object exists within the original image, the identification object region determiner preferably determines the identification object region at a different scanning interval depending on a position in the original image area. Thus, the identification object region determiner is capable of maintaining the accuracy with which an object can be identified within the entire image area of the original image, while also reducing the amount of processing operations.

The object identifying apparatus preferably further includes an image capturing unit that is mounted on a vehicle for acquiring an image in a vicinity of the vehicle by capturing the image while the vehicle is traveling, and the scanning interval in a lower position in the original image area, which is represented by the captured image acquired as the original image by the image capturing unit, preferably is greater than the scanning interval in an upper position in the original image area. An object that is far away from the vehicle tends to be displayed in a smaller size in an upper zone of the image area, whereas an object that is near to the vehicle tends to be displayed in a greater size in a lower zone of the image area. Consequently, the amount of processing operations can further be reduced.

The image feature quantity preferably is represented by a histogram, and the integration object images preferably are represented by binary voting data, which indicate whether each pixel of the original image belongs to any one of ranges of the histogram. If the image feature quantity is represented by a histogram, the number of integral images to be handled tends to be large. Consequently, in particular, a reduction in the amount of data based on the compression process is rendered significantly effective.

The object identifying apparatus preferably further includes an image capturing unit that is mounted on a vehicle for acquiring an image as the original image by capturing the image while the vehicle is traveling. The image capturing unit, which has high image resolution, typically is mounted on the vehicle in order to detect objects at a long distance and over a wide angle of view. The images captured in this manner are of high resolution, thus tending to increase the number of pixels of the integral images, as well as increasing the number of significant bits of data strings. Thus, in particular, a reduction in the amount of data based on the compression process also is rendered significantly effective.

The object identifying apparatus according to the present invention includes the data generator, which generates integral images, each including an image area having a size in common with the captured image and the integration object images, and the data acquirer, which acquires compressed data by extracting at least every other pixel along at least one direction from a plurality of pixels that make up the integral images. Consequently, the object identifying apparatus is capable of obtaining the compressed data that makes up the integral images, in which original information of the integration object images at the positions of the extracted pixels is retained without change. By appropriately using the retained image information, the accuracy with which an object is identified can be maintained, while the amount of data that makes up the integral images is greatly reduced.

DESCRIPTION OF EMBODIMENTS

An object identifying apparatus according to an embodiment of the present invention will be described below with reference to the accompanying drawings.

Figure 1:
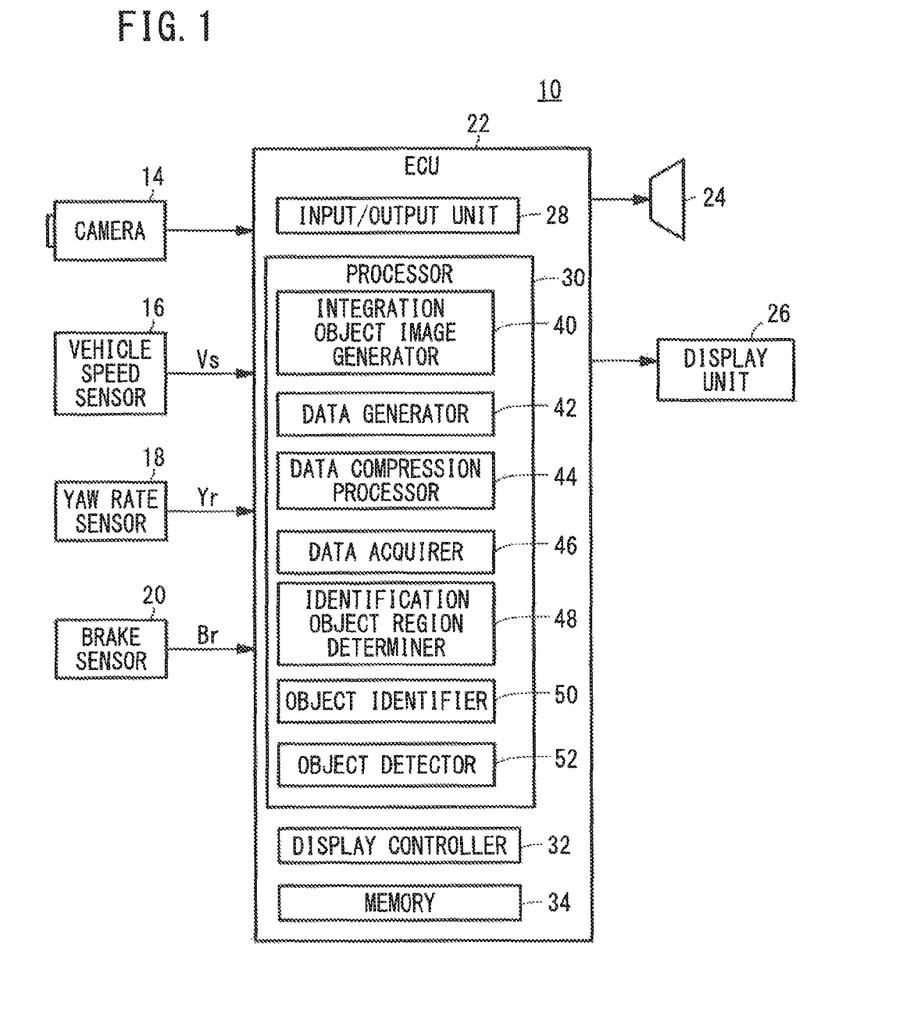
FIG. 1 is a block diagram showing a configuration of an object identifying apparatus according to an embodiment of the present invention.
Figure 2:
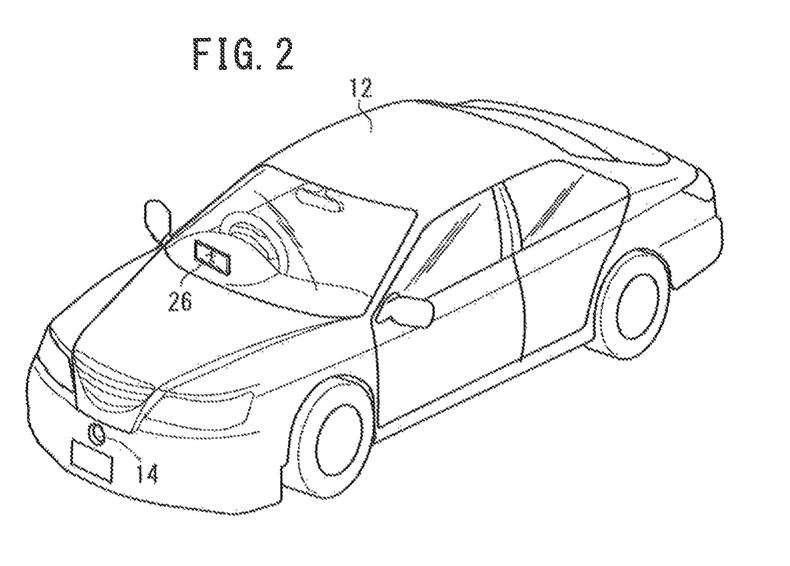
FIG. 2 is a schematic perspective view of a vehicle in which the object identifying apparatus shown in FIG. 1 is incorporated.

FIG. 1 is a block diagram showing a configuration of an object identifying apparatus 10 according to an embodiment of the present invention. FIG. 2 is a schematic perspective view of a vehicle 12 in which the object identifying apparatus 10 shown in FIG. 1 is incorporated.

As shown in FIGS. 1 and 2, the object identifying apparatus 10 includes a color camera 14 (hereinafter simply referred to as a "camera 14") for capturing a color image, hereinafter referred to as a "captured image Im" (original image), in a plurality of color channels, a vehicle speed sensor 16 for detecting a vehicle speed Vs of the vehicle 12, a yaw rate sensor 18 for detecting a yaw rate Yr of the vehicle 12, a brake sensor 20 for detecting a depressed angle Br of a brake pedal operated by the driver of the vehicle 12, an electronic control unit 22 (hereinafter referred to as an "ECU 22") for controlling the object identifying apparatus 10, a speaker 24 for outputting a sound warning or the like, and a display unit 26 for displaying the captured image that is output from the camera 14, etc.

The camera 14 is a camera using light having wavelengths mainly in the visible range, and functions as an image capturing means for capturing an image around the periphery of the vehicle 12. The camera 14 has characteristics such that, the greater the amount of light reflected from the surface of a subject is, the higher the level of an output signal from the camera becomes, thereby resulting in an increase in brightness, e.g., RGB values, of the image. As shown in FIG. 2, the camera 14 is fixedly disposed (mounted) in a substantially central region of a front bumper of the vehicle 12.

The image capturing means for capturing an image around the periphery of the vehicle 12 is not limited to the above structure (a so-called monocular camera), but may be a compound-eye camera (stereo camera). The image capturing means may be one or both of a monochromatic camera instead of a color camera, or an infrared camera. If the image capturing means is a monocular camera, then the monocular camera may be combined with a range finding means (radar apparatus).

Referring back to FIG. 1, the speaker 24 produces a warning sound or the like on the basis of a command from the ECU 22. The speaker 24 is mounted on a non-illustrated dashboard of the vehicle 12. Alternatively, a speech output function, which belongs to another apparatus (e.g., an audio system or a navigation system), may alternatively be used as the speaker 24.

The display unit 26 (see FIGS. 1 and 2) is a head-up display (HUD), which is positioned so that a display screen thereof is displayed on the front windshield of the vehicle 12, at a position where the display screen does not obstruct the forward vision of the driver. The display unit 26 is not limited to a HUD, but may be a display unit for displaying a map, etc., of a navigation system incorporated in the vehicle 12, or a display unit (multi-information display unit: MID) disposed in a meter unit for displaying mileage information, etc.

The ECU 22 basically includes an input/output unit 28, a processor 30, a display controller 32, and a memory 34.

Signals from the camera 14, the vehicle speed sensor 16, the yaw rate sensor 18, and the brake sensor 20 are input to the ECU 22 through the input/output unit 28. Signals from the ECU 22 are output through the input/output unit 28 to the speaker 24 and the display unit 26. The input/output unit 28 includes a non-illustrated A/D converting circuit for converting input analog signals into digital signals.

The processor 30 performs processing sequences on the signals from the camera 14, the vehicle speed sensor 16, the yaw rate sensor 18, and the brake sensor 20, and on the basis of results of the processing operations, generates signals that are supplied to the speaker 24 and the display unit 26. The processor 30 functions as an integration object image generator 40, a data generator 42 (data generating means), a data compression processor 44, a data acquirer 46 (data acquiring means), an identification object region determiner 48 (identification object region determining means), an object identifier 50 (object identifying means), and an object detector 52.

The various functions of the components of the processor 30 are realized by reading and executing programs stored in the memory 34. Alternatively, the programs may be supplied from an external source via a non-illustrated wireless communications unit (mobile phone, smartphone, or the like).

The display controller 32 is a control circuit for energizing and controlling the display unit 26. By supplying a display control signal to the display unit 26 through the input/output unit 28, the display controller 32 energizes the display unit 26 in order to display various images (the captured image Im, markings, etc.).

The memory 34 is composed of a random access memory (RAM) for storing captured image signals that have been converted into digital signals, temporary data used in various processing operations, etc., and a read only memory (ROM) for storing executable programs, tables and maps, etc.

The object identifying apparatus 10 according to the present embodiment is basically configured as described above. An outline of operations of the object identifying apparatus 10 will be described below.

The ECU 22 converts an analog video signal output from the camera 14 into a digital signal, and temporarily stores the digital signal in the memory 34, in each prescribed frame clock interval or period, e.g., in each of thirty frames per second. The ECU 22 then performs various processing operations on the captured image Im, i.e., an image in front of the vehicle 12, which is read from the memory 34.

The ECU 22, and in particular the processor 30, comprehensively evaluates the results of the processing sequences carried out on the captured image Im. Further, if necessary, the ECU 22 comprehensively evaluates signals representing the vehicle speed Vs, the yaw rate Yr, and the depressed angle Br, which indicate the traveling state of the vehicle 12, and detects a pedestrian, an animal, or the like, which exists in front of the vehicle 12, as an object to be monitored (hereinafter referred to as a "monitoring object" or simply an "object").

If the processor 30 assesses that there is a high possibility for the vehicle 12 to collide with the monitoring object, the ECU 22 controls the output units of the object identifying apparatus 10 in order to seek the attention of the driver. For example, the ECU 22 controls the speaker 24 to output a warning sound, e.g., a succession of blips, and highlights the monitoring object in the captured image Im that is displayed visually on the display unit 26.

The object identifying apparatus 10 according to the present embodiment is mounted on the vehicle 12, which serves as a mobile body. However, the object identifying apparatus 10 is not limited to this configuration and application. Alternatively, the object identifying apparatus 10 may be configured to acquire a sequence of captured images from the camera 14, which may be fixed to any of various stationary bodies including a building.

Figure 3:
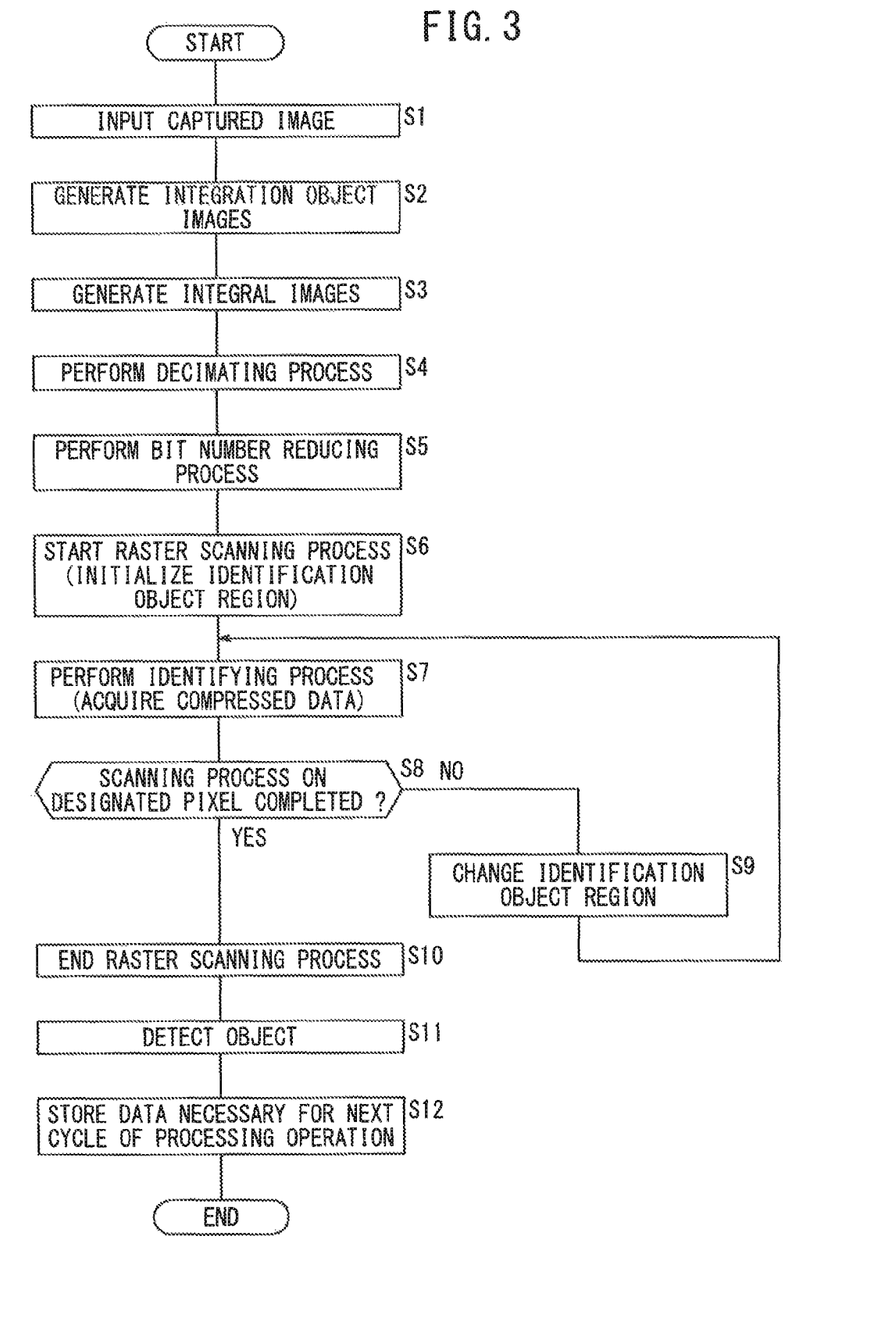
FIG. 3 is a flowchart of an operation sequence of an ECU shown in FIG. 1.

A detailed sequence of operations of the object identifying apparatus 10 will be described below with reference to the flowchart shown in FIG. 3. The sequence of operations is carried out for each of respective captured frames while the vehicle 12 is traveling.

In step S1, for each frame, the ECU 22 acquires and inputs a captured image Im of an area that lies within a given angle of view in front of the vehicle 12, which is represented by an output signal from the camera 14.

Figure 4A:
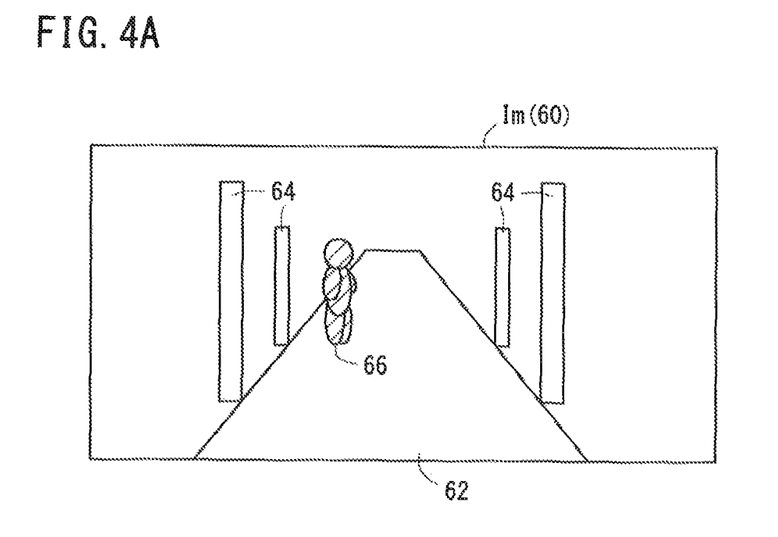
FIGS. 4A and 4B are views showing images captured by a camera.

As shown in FIG. 4A, it is assumed that the ECU 22 acquires a captured image Im in one frame at a given time from the camera 14. The captured image Im represents an original image area 60 (hereinafter referred to as an "image area 60") having a horizontally elongate rectangular shape made up of horizontal rows of 1200 pixels and vertical columns of 600 pixels, for example. The image area 60 includes a road region 62 (hereinafter referred to simply as a "road 62") along which the vehicle 12 travels, a plurality of utility pole regions 64 (hereinafter referred to simply as "utility poles 64"), which are installed at substantially regular intervals along the road 62, and a pedestrian region 66 (hereinafter referred to simply as a "pedestrian 66") on the road 62.

Figure 4B:
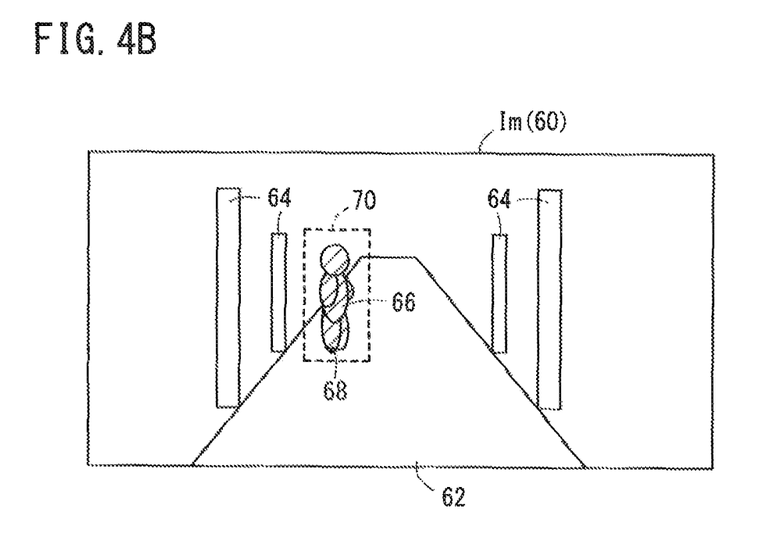

As shown in FIG. 4B, it is assumed that a position in the captured image Im, where an existing road surface (road 62) and a human body (pedestrian 66) are in contact with each other, is referred to as a reference position 68. A rectangular identification object region 70, i.e., a region within a rectangular frame indicated by the broken lines, is established according to predetermined rules using the reference position 68 as a landmark. The identification object region 70 corresponds to a region of interest for identifying whether or not an object including the pedestrian 66 exists, as well as for identifying the type of such an object.

In step S2, the integration object image generator 40 generates integration object images 81 through 88 (see FIG. 6) from the captured image Im that was input in step S1. In order to clarify the purpose of generating the integration object images 81 through 88, a feature quantity represented by histograms of oriented gradient (HOG), which indicate the brightness intensities and features of the gradient in a local region of an image, will first be described below.

Figures 5A, 5B:
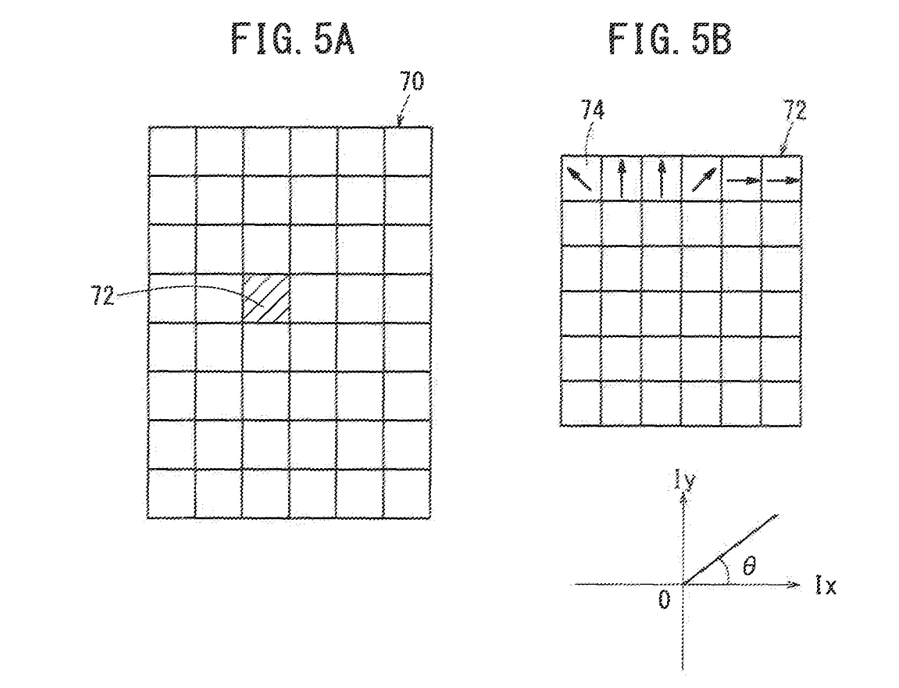
FIGS. 5A through 5C are diagrams illustrating a process for calculating a feature quantity represented by histograms of oriented gradient (HOG)

As shown in FIG. 5A, the identification object region 70 is divided into a grid pattern, thereby defining a plurality of blocks 72. In FIG. 5A, the rectangular identification object region 70 is divided into a two-dimensional pattern of equal blocks made up of eight rows and six columns of blocks. It is assumed that one of the blocks 72 is selected from the identification object region 70 as a unit for producing a histogram. It also is assumed that the selected block 72 is made up of a total of thirty-six pixels 74, which may be arranged in six vertical columns of pixels and six horizontal rows of pixels, for example.

As shown in FIG. 5B, a two-dimensional gradient (Ix, Iy) of brightness is calculated for each of the pixels 74 that make up the block 72. A brightness gradient intensity I and a brightness gradient angle θ ($0 \leq \theta < 2\pi$) are calculated according to the following equations (1) and (2).

$$I=(Ix^2+Iy^2)^{1/2} \quad (1)$$

$$\theta=\tan^{-1}(Iy/Ix) \quad (2)$$

Arrows marked on the respective cells of the first row illustrate in plan the directions of the brightness gradients. Although brightness gradient intensities I and brightness gradient angles θ actually are calculated for all of the pixels 74, the arrows in the respective pixels of the second and subsequent rows are omitted from illustration.

Figure 5C:
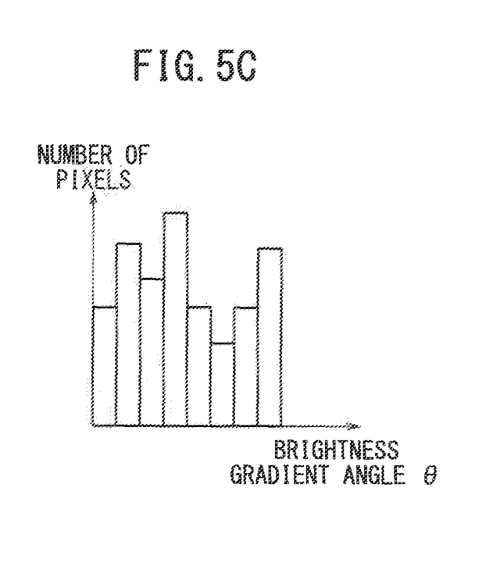

As shown in FIG. 5C, a histogram of brightness gradient angles θ is generated for each block 72. The horizontal axis of the histogram represents the brightness gradient angle θ, whereas the vertical axis represents the number of pixels. In FIG. 5C, the brightness gradient angles θ are grouped into a first range ($0 \leq \theta < \pi/4$), a second range ($\pi/4 \leq \theta < \pi/2$), ..., and an eighth range ($7\pi/4 \leq \theta < 2\pi$).

The histograms (brightness gradient intensities I and brightness gradient angles θ) for the respective blocks 72 are joined together according to a predetermined order, for example, in an ascending order, in order to obtain a HOG feature quantity of the identification object region 70. Each time that the position of the identification object region 70 (see FIG. 4B) changes within the image area 60, the values of the HOG feature quantity are changed. In particular, when a HOG feature quantity, which is represented by a histogram or the like, is calculated, the amount of processing operations that are required is vast, due to the fact that addition and conditional branching are involved for each pixel. In order to avoid repetitive processing operations, it is convenient to generate auxiliary interim data (an integration object image as a feature quantity of each pixel 74) in advance, and to use the auxiliary interim data in the process of calculating an image feature quantity.

Figure 6:
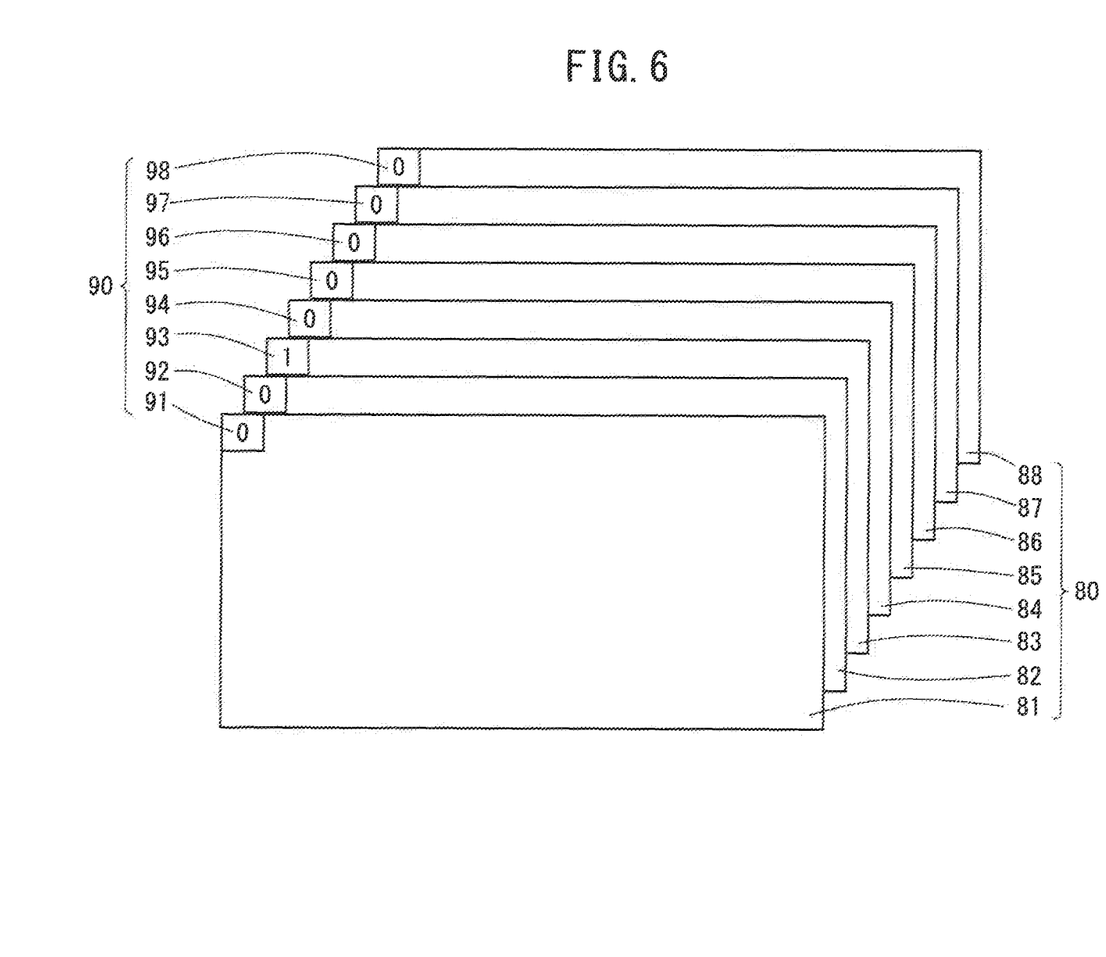
FIG. 6 is a diagram showing integration object images by way of example.

As shown in FIG. 6, respective image areas 80, which are represented by the integration object images 81 through 88, are identical in shape and have a common size with the image area 60 (see FIGS. 4A and 4B) represented by the captured image Im. Pixels in the integration object images 81 through 88, which correspond respectively to the positions of pixels 90 in the image areas 80, will hereinafter be referred to as corresponding pixels 91 through 98.

According to the present embodiment, an attribute of each pixel 90 is determined depending on the brightness gradient angle θ as the image feature quantity. For example, if the brightness gradient angle θ of a pixel 90 is θ=2π/3, the pixel 90 belongs to the third range (π/2≤θ<3π/4). In this case, the integration object image generator 40 assigns a pixel value "1" to a corresponding pixel 93 of the integration object image 83 depending on the third range. The integration object image generator 40 assigns a pixel value "0" to respective corresponding pixels 91, 92, 94 through 98 of the remaining integration object images 81, 82, 84 through 88.

In this manner, the integration object image generator 40 successively determines pixel values of the corresponding pixels 91 through 98 by alternatively assigning the pixel value "1" with respect to all of the pixels 90 in the image areas 80. Stated otherwise, the integration object images 81 through 88 serve as binary voting data for indicating whether or not each pixel 90 belongs to any one of the first through eighth ranges. In addition to the value of the brightness gradient angle θ, the value of the brightness gradient intensity I may also be taken into account as a criterion for assessing whether or not each pixel 90 belongs to any one of the first through eighth ranges. For example, the integration object image generator 40 may assign a pixel value "1" to a corresponding pixel only if the brightness gradient intensity I is of a value equal to or greater than a prescribed threshold value, e.g., an integral value of 4, thereby reducing adverse effects such as camera noise or the like. The integration object images 81 through 88 are not necessarily limited to the above voting data, but may employ various definitions insofar as such definitions represent an image feature quantity of each of the pixels 74, such as the value of the brightness gradient intensity I or the captured image Im (original image) itself.

In step S3, the data generator 42 generates integral images 101 through 108, respectively, from the integration object images 81 through 88 that were generated in step S2. The term "integral image" refers to an image that is produced by successively integrating pixel values of the integration object images 81 through 88 (image areas 80) from a starting point at any one of the angular positions of the integration object images 81 through 88. A pixel value integrated according to the above rule will hereinafter be referred to as an "integrated pixel value".

Figure 7:
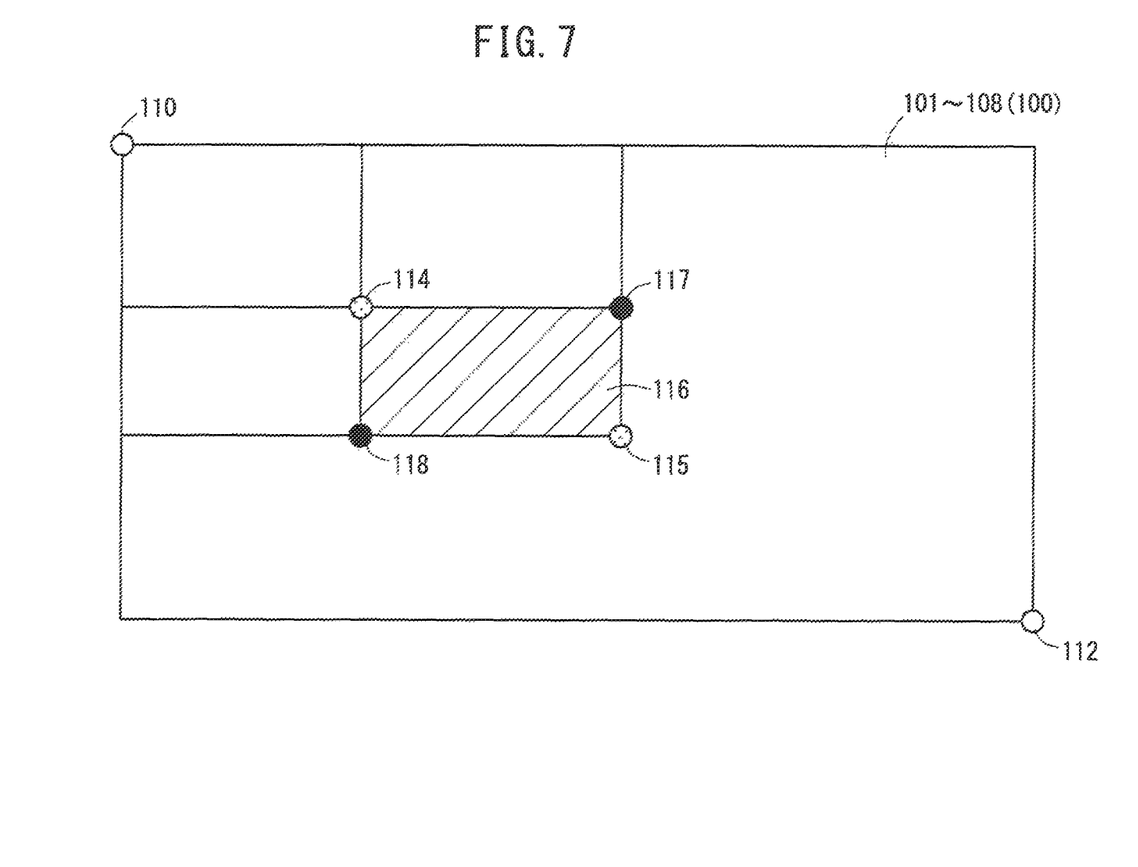
FIG. 7 is a diagram illustrating a process, using integral images, for calculating an integral pixel value within an optional region of integration object images.

As shown in FIG. 7, respective image areas 100, which are represented by the integral images 101 through 108, are identical in shape and have a common size with the image areas 80, which are represented respectively by the integration object images 81 through 88 (see FIGS. 6A and 6B). Each of the integral images 101 through 108 is generated, starting from a starting point 110 and ending at an ending point 112. The integrated pixel value at a position 114, i.e., a position within the image areas 100, for example, is represented by the total of the pixel values that lie within a rectangular area, the diagonal line of which is given as a line segment interconnecting the starting point 110 and the position 114.

By way of example, the total of the pixel values will be calculated within a rectangular calculation range 116, the diagonal line of which is given as a line segment interconnecting the position 114 and a position 115. The total of the pixel values in the calculation range 116 is calculated by subtracting the sum of integrated pixel values at positions 117 and 118 (two vertices) from the sum of integrated pixel values at the positions 114 and 115 (other two vertices). Such a calculation process makes it possible to significantly reduce the number of times that the memory (memory 34) is accessed, compared with a process of successively reading pixel values of all of the pixels in the image areas 80 and adding the pixel values. As a result, the processing operation for adding the pixel values can be performed at a higher speed.

In step S4, the data compression processor 44 performs a decimating process for reducing the number of image pixels for each of the integral images 101 through 108 that were generated in step S3. The decimating process refers to a process of extracting at least every other pixel along at least one direction from the image area 100 (see FIG. 7). According to the present embodiment, the data compression processor 44 performs the decimating process two-dimensionally, or more specifically, along an X direction and a Y direction perpendicular to the X direction. However, the data compression processor 44 may perform a decimating process along either one of the directions, i.e., along the X direction or along the Y direction.

Figure 8A:
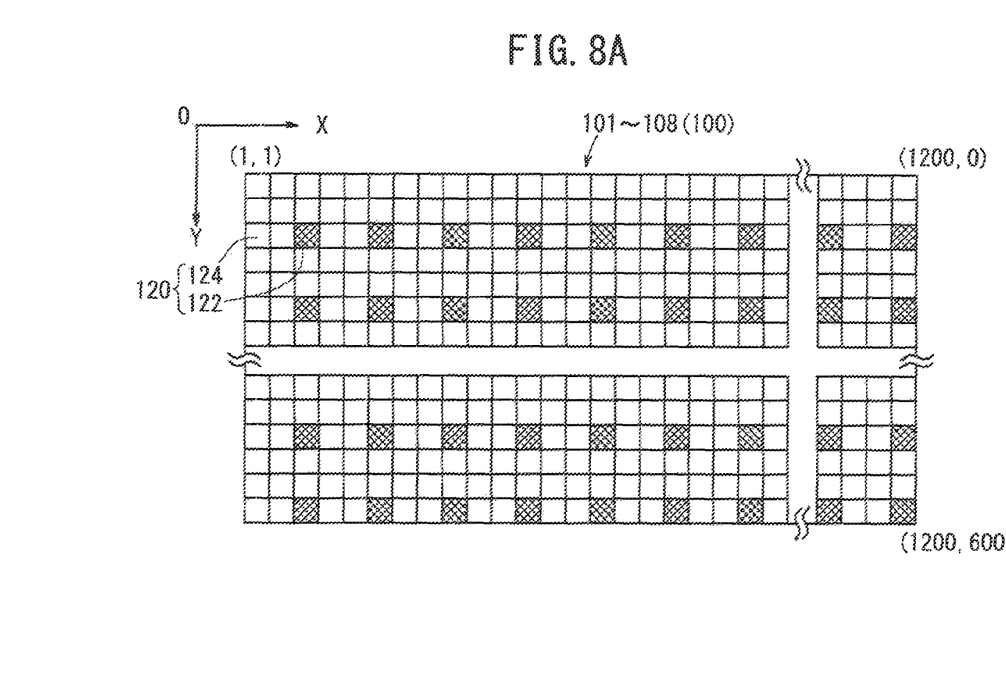
FIG. 8A is a diagram of an integral image before a decimating process is carried out.

As shown in FIG. 8A, each of the integral images 101 through 108 is made up of a plurality of pixels 120 arranged in a two-dimensional matrix, including rows of 1200 pixels along the X direction and columns of 600 pixels along the Y direction. For example, the data compression processor 44 extracts every third pixel along the X direction and every third pixel along the Y direction. In this manner, the data compression processor 44 extracts pixels 122, i.e., the rectangular cells shown in hatching, which make up ⅑ of all of the pixels 120, and excludes decimated pixels 124, i.e., the blank rectangular cells, which make up ⅚ of all of the pixels 120.

Figure 8B:
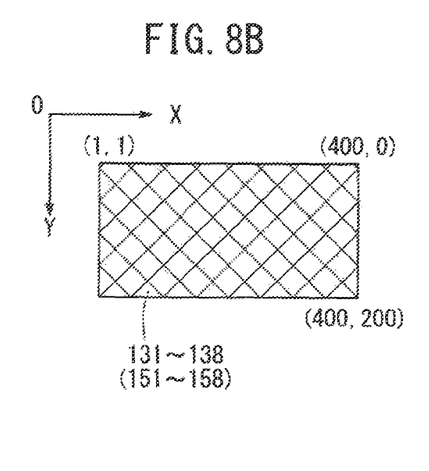
FIG. 8B is a diagram of an integral image after a decimating process has been carried out.

As a result, as shown in FIG. 8B, the data compression processor 44 produces integral images, hereinafter referred to as "first compressed images 131 through 138" (compressed data), each of which is made up of extracted pixels 122 arranged in a two-dimensional matrix, including rows of 400 pixels along the X direction and columns of 200 pixels along the Y direction. The first compressed images 131 through 138 are stored in a memory area of the memory 34, which may be the same as or different from the memory area in which the integration object images 81 through 88 are stored.

Advantages that accrue from the decimating process (step S4) will be described below with reference to FIGS. 9A through 9C. Each of FIGS. 9A through 9C shows schematically a captured image Im that is input to the integration object image generator 40 shown in FIG. 1.

Figure 9A:
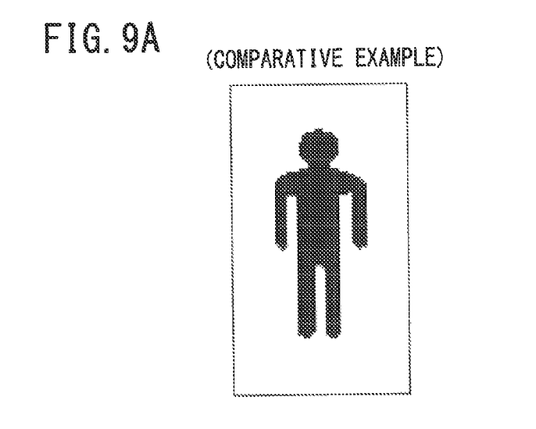
FIGS. 9A through 9C are diagrams schematically showing captured images that are input to an integration object image generator shown in FIG. 1.

FIG. 9A shows schematically a captured image Im, the resolution of which has not been changed. Although details are rendered appropriately in the captured image Im shown in FIG. 9A, a problem occurs in that a vast amount of data must be handled in a subsequent identification process.

Figure 9B:
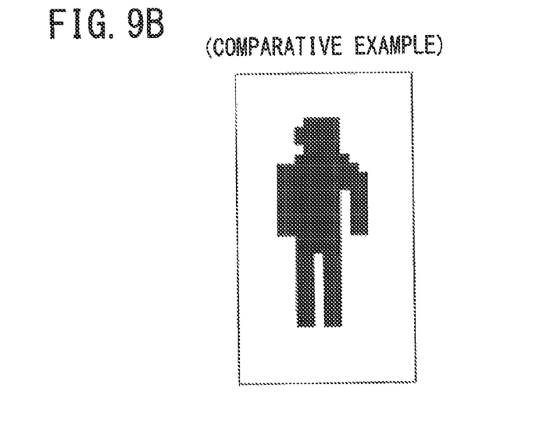

FIG. 9B shows schematically a captured image Im, the resolution of which has been changed to ⅓, i.e., the pixel size of which has been increased by three times both vertically and horizontally. The captured image Im shown in FIG. 9B allows the amount of data of the integral images to be greatly reduced, by about 90%, but suffers from a new problem in that the amount of information of the image itself becomes reduced due to the reduced resolution. More specifically, on account of the reduced resolution of the original image, detailed features, i.e., brightness gradient intensities I and brightness gradient angles θ of the object, are lost.

Figure 9C:
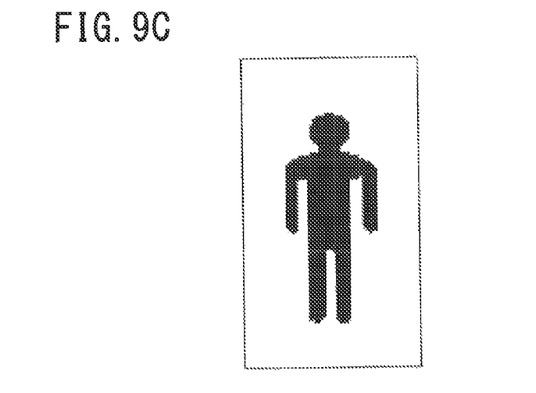

FIG. 9C shows schematically a captured image Im, the resolution of which has not been changed. As can be understood from FIG. 9C, the captured image Im renders details appropriately, in the same manner as with the captured image Im shown in FIG. 9A. The decimating process, which is performed after the integral images 101 through 108 are generated, is effective to significantly reduce the amount of data by about 90%. Nevertheless, detailed information remains for each of the integrated pixel values, which is about the same as the detailed information shown in FIG. 9A. This is because an integral image retains an integrated pixel value for each pixel, and the integrated pixel value is not adversely affected by the subsequent decimating process.

If the image feature quantities are represented by histograms, and the integration object images 81 through 88 are represented by binary voting data, which indicates whether or not each pixel 74 of the captured image Im belongs to any one of the first through eighth ranges, then the number of integral images to be handled tends to be large. Consequently, based on the compression process, in particular, a reduction in the amount of data is rendered significantly effective.

Furthermore, the camera 14, which has high image resolution, typically is mounted on the vehicle 12 in order to detect objects at a long distance and over a wide angle of view. Captured images Im, which are generated by the camera 14, are of high resolution, thus tending to increase the number of pixels of the integral images, as well as increasing the number of significant bits of data strings (pixel values). Thus, in particular, a reduction in the amount of data based on the compression process also is rendered significantly effective.

In step S5, the data compression processor 44 carries out a bit number reducing process, in order to reduce the amount of data of each pixel by at least one bit, on each of the first compressed images 131 through 138 on which the decimating process of step S4 has been performed.

Figure 10:
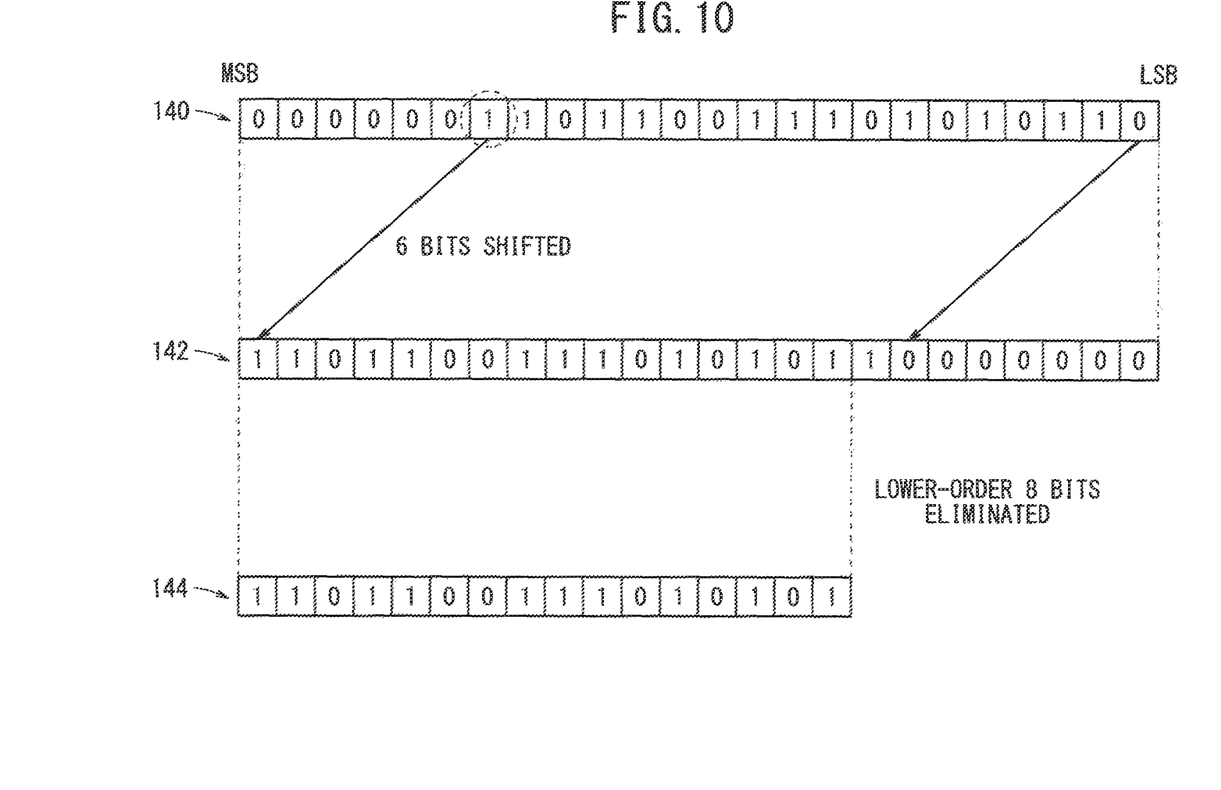
FIG. 10 is a diagram illustrating a bit eliminating process.

As shown in FIG. 10, a data string 140 is defined by a binary data string, which represents, in binary notation, an integrated pixel value (3 bytes) of an extracted pixel 122 (see FIG. 8A) depending on the ending point 112 (see FIG. 7). Within the data string 140 and the data strings 142, 144, to be described later, the least significant bit (LSB) is referred to as a first bit, and the most significant bit (MSB) is referred to as a 24th bit.

According to the present embodiment, since each of the pixel values of the integration object images 81 through 88 (see FIG. 6) is a non-negative value (0 or 1), the value represented by the data string 140 corresponds to a maximum value of the extracted pixel 122. Stated otherwise, the number of effective bits of the data string 140 is 18, and the values of the 19th through 24th bits are 0. The image area 100 shown in FIG. 8A can theoretically assume a maximum value of 19.5 bits. However, if the distribution of the brightness gradient angles θ is essentially uniform, then the maximum value is about 17 bits.

As shown in FIG. 10, the data compression processor 44 carries out a bit shifting operation on the data string 140, thereby producing a data string 142 having an 18th bit that coincides with the 24th bit (MSB) of the data string 140. Thereafter, as shown in FIG. 10, the data compression processor 44 deletes the lower-order 8 bits (one byte) of the data string 142 while retaining the higher-order 16 bits (2 bytes), thereby producing a 2-byte data string 144, which is of a substantially effective value. Eliminating the lower-order bits also is effective to digitally remove electric noise, which may be added when the image is captured by the camera 14.

Alternatively, the data compression processor 44 may determine the number of bits to be eliminated depending on the data transfer protocol between the processor 30 and the memory 34. For example, the data compression processor 44 is capable of reducing the total amount of data to be transferred by eliminating bits, such that the compressed data string 144 becomes an integral multiple of a unit of transferred data.

As a result, the data compression processor 44 produces integral images, hereinafter referred to as "second compressed images 151 through 158" (compressed data), each of which is made up of extracted pixels 122 arranged in a two-dimensional matrix of 2-byte integrated pixel values. The second compressed images 151 through 158 are stored in a memory area of the memory 34, which may be the same as or different from the memory area in which the first compressed images 131 through 138 are stored.

In step S6, the processor 30 initiates a raster scanning process on the captured image Im. The raster scanning process refers to a process for sequentially identifying whether or not an object exists in the captured image Im, while the reference position 68 (a pixel in the captured image Im; see FIG. 4B) is moved a prescribed distance (scanning interval) along the scanning direction. Thereafter, the identification object region determiner 48 sequentially determines the presently scanned reference position 68 and the position of the identification object region 70 (see FIG. 4B) that is identified from the reference position 68. At first, the identification object region determiner 48 initializes the reference position 68 and the identification object region 70.

Each time that the raster scanning process is performed, the data acquirer 46 reads and acquires from the memory 34 the second compressed images 151 through 158 on a timely basis. According to the present embodiment, the data acquirer 46 is only required to directly read the integrated pixel values at designated addresses of the second compressed images 151 through 158 stored in the memory 34, and there is no need for the data acquirer 46 to perform other processing sequences. When reading the integration object images 81 through 88, the data acquirer 46 may perform processes equivalent to the decimating process (see step S4) and/or the bit number reducing process (see step S5) carried out by the data compression processor 44.

In step S7, the object identifier 50 identifies whether at least one type of object exists within the determined identification object region 70. Prior to the identifying process, the data acquirer 46 reads and acquires from the memory 34 various data, e.g., the second compressed images 151 through 158, required for the identifying process.

If the data compression processor 44 has carried out the bit number reducing process (refer to step S5), the data acquirer 46 changes the data definition inherent in the second compressed images 151 through 158 to an appropriate data definition, which is suitable for input to the object identifier 50. For example, the data acquirer 46 may restore the original data definition using the reduced number of bits and the amount of bit shift (number and direction of bits), or may acquire the data in an unchanged form.

More specifically, the object identifier 50 successively acquires the integrated pixel values of the second compressed images 151 through 158 corresponding to the blocks 72, and joins respective values obtained by calculating the number of pixels that belong to the first through eighth ranges, thereby generating histograms corresponding to the blocks 72. Then, the object identifier 50 successively joins the histograms of the respective blocks 72, thereby producing a HOG feature quantity, which is a type of image feature quantity, in the identification object region 70. The image feature quantity may be of any type or may be calculated by any of various processes. For example, the image feature quantity may be an edge feature quantity, which is typified by a HOG feature quantity, or a brightness feature quantity, which is typified by a Haar-like feature quantity.

The object identifier 50 is an identifying device, which is generated using a machine learning process, with an image feature quantity, e.g., a HOG feature quantity, at the identification object region 70 being input thereto, and with information as to whether or not an object exists that is output therefrom. The machine learning process may be based on any of various algorithms, including a supervised learning algorithm, an unsupervised learning algorithm, and a reinforcement learning process. Examples of learning architecture include a boosting process including AdaBoost, a support vector machine (SVM), a neural network, and an expectation maximization (EM) algorithm.

Examples of an object that can be identified include human bodies (a pedestrian 66 as shown in FIG. 4A), various animals (specifically, mammals such as deer, horses, sheep, dogs, cats, etc., birds, etc.) and artificial structures (specifically, vehicles, markings, utility poles, guardrails, walls, etc.).

In step S8, the identification object region determiner 48 assesses whether or not the scanning process has been completed on the designated pixel. If the identification object region determiner 48 assesses that the scanning process has not been completed (step S8: NO), then control proceeds to the next step S9.

In step S9, the identification object region determiner 48 changes the position or size of the identification object region 70. More specifically, the identification object region determiner 48 moves the designated pixel to be scanned, e.g., the reference position 68, by a prescribed distance, e.g., a distance corresponding to three pixels, along a prescribed direction, e.g., a rightward direction.

Figure 11:
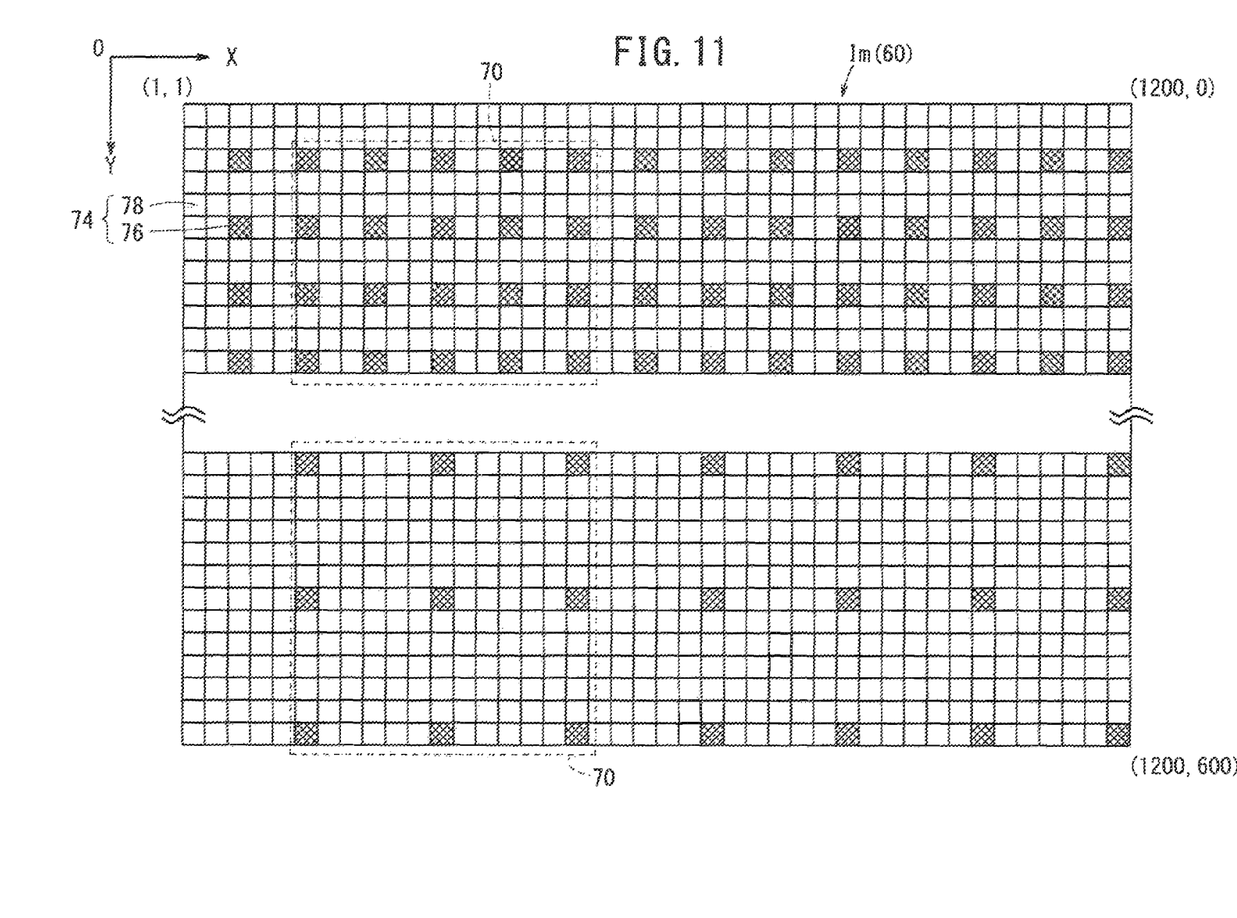
FIG. 11 is a diagram illustrating a process for determining an identification object region.

As shown in FIG. 11, in the same manner as with the integration object image 81, the integral image 101, etc., the captured image Im (image area 60) is made up of a plurality of pixels 74 arranged in a two-dimensional matrix, including rows of 1200 pixels along the X direction and columns of 600 pixels along the Y direction.

In view of the relationship with the integral images 101 through 108 (see FIG. 8A), the pixels 74 generally are classified into referable pixels 76 (the rectangular cells shown in hatching) for which integrated pixel values can be referred to, and non-referable pixels 78 (the blank rectangular cells) for which integrated pixel values cannot be referred to. The identification object region determiner 48 determines identification object regions 70, which may be of a rectangular or cuboidal shape, for example, having at least four referable pixels 76 located at vertices thereof, the identification object regions 70 being selected respectively from pixel groups extracted as the second compressed images 151 through 158. Thus, the total of the pixel values of the integration object images 81 through 88 can be calculated accurately, even from the second compressed images 151 through 158 in which the number of pixels 120 (see FIG. 8A) thereof has been reduced.

An object that exists remotely, i.e., far away, from the vehicle 12 tends to be displayed in a smaller size and in an upper zone of the image area 60, whereas an object that exists in close proximity, i.e., near, to the vehicle 12 tends to be displayed in a greater size and in a lower zone of the image area 60. In view of the above tendency, in order to further reduce the amount of processing operations, the identification object region determiner 48 changes the scanning interval, i.e., the number of times that the scanning cycle is carried out, depending on the position within the image area 60. As shown in FIG. 11, the identification object region determiner 48 may set a relatively small scanning interval (every third pixel in both vertical and horizontal directions) in the upper zone of the image area 60, and may set a relatively large scanning interval (every sixth pixel in both vertical and horizontal directions) in the lower zone of the image area 60.

When the identification object region determiner 48 determines an identification object region 70 and the object identifier 50 identifies a given object, the identification object region determiner 48 changes the scanning interval depending on the position, i.e., features of the captured image Im, within the image area 60. Consequently, the accuracy with which an object is identified within the entire image area 60 can maintained, while also reducing the amount of processing operations.

Thereafter, the control returns to step S7, and the processor 30 repeats steps S7 through S9 until the scanning process on all of the designated pixels has been completed. If it is judged that the scanning process is completed (step S8: YES), then in step S10, the processor 30 terminates the raster scanning process on the captured image Im.

In step S11, the object detector 52 detects an object that exists within the captured image Im. The object detector 52 may use an identification result in a single frame, or may take into account identification results in a plurality of frames, so that a motion vector of one object can be calculated.

In step S12, the ECU 22 stores in the memory 34 data that are needed for the next cycle of processing operations. For example, the data may include an attribute of the object (pedestrian 66 in FIG. 4A), which was obtained in step S7, the reference position 68, or the like.

By successively carrying out the above operation sequence, the object identifying apparatus 10 is capable of monitoring an object that exists in front of the vehicle 12 at prescribed time intervals.

As described above, the object identifying apparatus 10 includes the data generator 42 for generating integral images 101 through 108, each including an image area 100 having a size in common with a captured image Im, and integration object images 81 through 88, the data acquirer 46 for acquiring compressed data (first compressed data 131 through 138, second compressed data 151 through 158) by extracting at least every other pixel (extracted pixels 122) along at least one direction from a plurality of pixels 120 that make up the integral images 101 through 108, the identification object region determiner 48 for determining an identification object region 70 from within an image area 60, and the object identifier 50 for calculating the total of the pixel values of the integration object images 81 through 88 in the identification object region 70 as an image feature quantity using the compressed data, and on the basis of the image feature quantity, identifying whether or not an object (e.g., pedestrian 66) exists within the identification object region 70 in the captured image Im.

The object identifying apparatus 10, which is configured as described above, is capable of obtaining the first compressed images 131 through 138, in which original information of the integration object images 81 through 88 at the positions of the extracted pixels 122 is retained without change. By appropriately using the retained image information, the accuracy with which an object is identified can be maintained, while the amount of data of the integral images 101 through 108 is greatly reduced.

The present invention is not limited to the embodiment described above. The embodiment may be changed or modified without departing from the scope of the present invention.

For example, in the present embodiment, the aforementioned image processing sequence is carried out on the captured image Im, which is produced by the monocular camera (camera 14). However, the same advantages as those described above can be obtained by performing the image processing sequence on a captured image that is produced by a compound-eye camera (stereo camera). The image area represented by the original image is not limited to a planar area (two-dimensional area), but may be a cubic area (three-dimensional area), or an image area in which a temporal concept is incorporated.

The invention claimed is:

1. An object identifying apparatus comprising:
   an image capturing unit that is mounted on a vehicle for acquiring an original image by capturing the original image while the vehicle is traveling;
   a data generator for successively integrating pixel values of integration object images representing feature quantities at respective pixels that make up the original image, from a starting point at either one of angular positions of the integration object images, thereby generating integral images, each including an image area having a size in common with the original image and the integration object images;
   a data acquirer for acquiring compressed data by extracting at least every other pixel along at least one direction from a plurality of pixels that make up the integral images generated by the data generator;
   an identification object region determiner for determining an identification object region from within an original image area represented by the original image; and
   an object identifier for calculating a total of the pixel values of the integration object images within the identification object region that was determined by the identification object region determiner, as an image feature quantity using the compressed data acquired by the data acquirer, and on the basis of the image feature quantity, identifying whether or not an object exists within the identification object region in the original image,
   wherein the image feature quantity is represented by a histogram.

2. The object identifying apparatus according to claim 1, wherein the identification object region determiner determines the identification object region, which includes at least four pixels at vertices thereof, selected respectively from pixel groups extracted as the compressed data.

3. The object identifying apparatus according to claim 1, wherein the data acquirer acquires the compressed data by reducing the amount of data of each of the pixels of the integral images by at least one bit.

4. The object identifying apparatus according to claim 1, wherein if the identification object region determiner determines the identification object region, and the object identifier identifies the object (66) while a position of the identification object region is changed sequentially along a scanning direction at a scanning interval, thereby identifying whether or not the object (66) exists within the original image, the identification object region determiner determines the identification object region at a different scanning interval depending on a position in the original image area.

5. The object identifying apparatus according to claim 4, further comprising:
   an image capturing unit mounted on a vehicle for acquiring an image in a vicinity of the vehicle by capturing the image while the vehicle is traveling,
   wherein the scanning interval in a lower position in the original image area, which is represented by the captured image acquired as the original image by the image capturing unit, is greater than the scanning interval in an upper position in the original image area.

6. The object identifying apparatus according to claim 1, wherein
   the integration object images are represented by binary voting data, which-indicate whether each pixel of the original image belongs to any one of ranges of the histogram.

7. An object identifying apparatus comprising:
   an image capturing unit that is mounted on a vehicle for acquiring an original image by capturing the original image while the vehicle is traveling;
   a data generator for successively integrating pixel values of integration object images representing feature quantities at respective pixels that make up the original image, from a starting point at either one of angular positions of the integration object images, thereby generating integral images, each including an image area having a size in common with the original image and the integration object images;
   a data acquirer for acquiring compressed data by extracting at least every other pixel along at least one direction from a plurality of pixels that make up the integral images generated by the data generator;
   an identification object region determiner for determining an identification object region from within an original image area represented by the original image; and
   an object identifier for calculating a total of the pixel values of the integration object images within the identification object region that was determined by the identification object region determiner, as an image feature quantity using the compressed data acquired by the data acquirer, and on the basis of the image feature quantity, identifying whether or not an object exists within the identification object region in the original image,
   wherein the integration object images are represented by binary voting data.

\* \* \* \* \*